W. L. MORFORD.
FURROW OPENER AND CLOSER.
APPLICATION FILED MAR. 15, 1913.
1,128,176.
Patented Feb. 9, 1915.
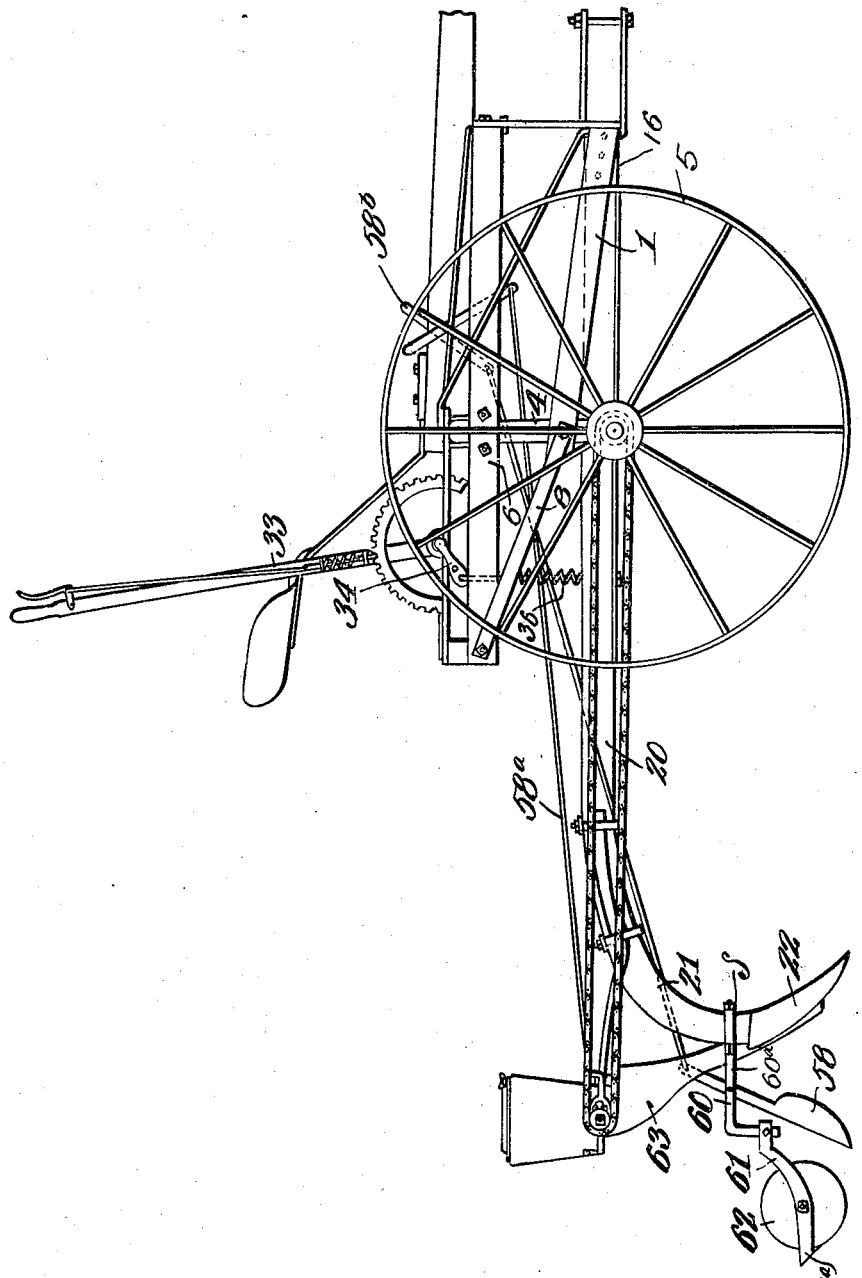
William L. Morford,
Inventor
by C. A. Snow & Co.
Attorneys

UNITED STATES PATENT OFFICE.

WILLIAM L. MORFORD, OF MAITLAND, MISSOURI.

FURROW OPENER AND CLOSER.

1,128,176.  Specification of Letters Patent.  Patented Feb. 9, 1915.

Application filed March 15, 1913. Serial No. 754,633.

*To all whom it may concern:*

Be it known that I, WILLIAM L. MORFORD, a citizen of the United States, residing at Maitland, in the county of Holt and State of Missouri, have invented a new and useful Furrow Opener and Closer, of which the following is a specification.

The device forming the subject matter of this application is a furrow opener and closer, and the invention aims to provide a device of the type above mentioned in which there is established a novel relation between the furrow opener, the furrow closer, and the packing element, the furrow closer being mounted to assume novel relations with respect to the furrow opener and the packing element.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings, the invention is disclosed in a single figure, the device being shown in side elevation.

In carrying out the invention there is provided a frame 1 the same carrying ground wheels 5. Plow beams 20 extend longitudinally of the frame 1, the forward ends 16 of the plow beams 20 being pivoted in any desired manner to the frame. The plow beams 20 terminate in goose necks 21 carrying furrow openers 22. A lever 33 and suitable connections 34 and 36 are provided for raising and lowering each plow beam 20.

Furrow closers 58 are shown, the same being pivoted at 60$^a$ to brackets 60 on the goose necks 21. The brackets 60 are held to the goosenecks 21 for vertical adjustment by clamp screws S. The furrow closers 58 are manipulated to regulate the depth at which the seed is buried, by connections 58$^a$ actuated by a pedal 58$^b$ located on the tongue 23. Upon each bracket 60 is mounted, for swinging movement, an arm 61 carrying a pressure wheel 62. The arm 61 supports a cleaner 61$^a$ located in close relation to the periphery of the pressure wheel 62, the cleaner 61$^a$ serving to remove adhering material from the periphery of the pressure wheel. A spout 63 communicating with each seed receptacle 43 discharges between the furrow closer 58 and furrow opener. The furrow closer 58 may be adjusted vertically along the goose neck 21, through the medium of the clamp 60.

Generally considered, the device hereinbefore described comprises a frame 1, a beam 20 carried thereby, a furrow opener 22 mounted on the beam, a packing member 62 located to the rear of the furrow opener and supported by the beam, a furrow closer 58 located intermediate the furrow opener 22 and the packing member 62, a beam supported pivot element 60$^a$ upon which the closer 58 is mounted to swing to move the lower end of the closer at different times toward and away from either the opener or the packing member and to dispose the lower end of the closer upon opposite sides of a vertical line passing through the pivot element 60$^a$, the lower end of the closer 58 moving in an arc of which the pivot element 60$^a$ is a center, thereby to raise the lower end of the closer as the same moves toward the opener 22 and toward the packing member 62.

What is claimed is:—

1. In a device of the class described, a frame; a beam carried thereby; a furrow opener mounted on the beam; a packing member located to the rear of the furrow opener and supported by the beam; a furrow closer located intermediate the furrow opener and the packing member; a beam-supported pivot element upon which the closer is mounted to swing to move the lower end of the closer at different times toward and away from either the opener or the packing member and to dispose the lower end of the closer upon opposite sides of a vertical line passing through the pivot element, the lower end of the closer moving in an arc of which the pivot element is a center, thereby to raise the lower end of the closer as the same moves toward the opener or toward the packing member.

2. In a device of the class described, a frame; a beam pivoted to the frame; a furrow opener carried by the beam; a bracket secured to the beam and projecting rearwardly therefrom; a furrow closer carried by the intermediate portion of the bracket; an arm pivoted to the rear end of the bracket; and a packer wheel journaled on the arm.

3. In a device of the class described, a frame; a beam carried thereby; a furrow opener carried by the beam; a furrow closer fulcrumed intermediate its ends and supported from the beam; and a means under the control of an operator and connected with the upper end of the furrow closer for swinging the same on its fulcrum.

4. In a device of the class described, a frame; a beam pivoted to the frame; a furrow opener carried by the beam; a bracket secured to the beam and projecting rearwardly therefrom; a furrow closer fulcrumed intermediate its ends on the bracket; means connected with the upper end of the furrow closer for actuating the same; an arm pivoted to the rear end of the bracket; and a packing element carried by the arm.

In testimony that I claim the foregoing as my own, I have hereto affixed my signature in the presence of two witnesses.

WILLIAM L. MORFORD.

Witnesses:
M. J. MORFORD,
M. W. BRUMBAUGH.

Copies of this patent may be obtained for five cents each, by addressing the "Commissioner of Patents, Washington, D. C."